(12) United States Patent
Ienaga

(10) Patent No.: US 11,912,529 B2
(45) Date of Patent: Feb. 27, 2024

(54) CABLE REELING DEVICE

(71) Applicant: INTE CORPORATION, Hyogo (JP)

(72) Inventor: Yoshitsugu Ienaga, Hyogo (JP)

(73) Assignee: INTE CORPORATION, Hyogo (JP)

( * ) Notice: Subject to any disclaimer, the term of this patent is extended or adjusted under 35 U.S.C. 154(b) by 293 days.

(21) Appl. No.: 17/057,271

(22) PCT Filed: Feb. 1, 2020

(86) PCT No.: PCT/JP2020/003838
§ 371 (c)(1),
(2) Date: Nov. 20, 2020

(87) PCT Pub. No.: WO2020/175017
PCT Pub. Date: Sep. 3, 2020

(65) Prior Publication Data
US 2021/0380368 A1 Dec. 9, 2021

(30) Foreign Application Priority Data

Feb. 27, 2019 (JP) ................................ 2019-033690

(51) Int. Cl.
*B65H 75/40* (2006.01)
*B65H 75/42* (2006.01)
(Continued)

(52) U.S. Cl.
CPC ....... *B65H 75/425* (2013.01); *B65H 75/4497* (2013.01); *H02G 1/00* (2013.01); *B65H 2403/10* (2013.01); *B65H 2701/34* (2013.01)

(58) Field of Classification Search
CPC ...... B65H 75/40; B65H 75/44; B65H 75/425; B65H 75/4497; H02G 1/00; H02G 1/06
See application file for complete search history.

(56) References Cited

U.S. PATENT DOCUMENTS

| 3,458,152 A * | 7/1969 | Barkley | ................. H02G 11/02 |
| | | | 242/397.2 |
| 4,371,147 A * | 2/1983 | Ridgway | ................. B66D 1/36 |
| | | | 254/397 |

(Continued)

FOREIGN PATENT DOCUMENTS

| JP | H05-050916 U | 7/1993 |
| JP | H11-127513 A | 5/1999 |

(Continued)

OTHER PUBLICATIONS

International Search Report issued in Patent Application No. PCT/JP2020/003838 dated Apr. 7, 2020.

*Primary Examiner* — Sang K Kim
(74) *Attorney, Agent, or Firm* — PEARNE & GORDON LLP

(57) ABSTRACT

In a conventional method for extracting a cable, a power cable is reeled in by rotating a reel drum using a drive motor, and therefore there are cases where a power cable in a conduit cannot be extracted with the driving force of the drive motor when a large extraction force is required to extract the power cable from the conduit. The present invention is capable of directly transmitting, to a cable drum (5), a rotational force of rubber tires (9) whose outer circumferential portions are made of elastic rubber, by rotating the rubber tires (9) while bringing the rubber tires (9) into intimate contact with outer faces of the cable drum (5), and is capable of reliably rotating the cable drum (5).

4 Claims, 17 Drawing Sheets

(51) Int. Cl.
*B65H 75/44* (2006.01)
*H02G 1/00* (2006.01)

(56) References Cited

U.S. PATENT DOCUMENTS

| | | | | |
|---|---|---|---|---|
| 4,583,714 A * | 4/1986 | Ridgway | .................. | B66D 1/36 |
| | | | | 254/326 |
| 5,558,118 A * | 9/1996 | Mooring | .................. | F16L 3/012 |
| | | | | 137/342 |
| 2014/0070045 A1* | 3/2014 | Robinson | ............... | B65H 57/18 |
| | | | | 242/566 |

FOREIGN PATENT DOCUMENTS

| | | | |
|---|---|---|---|
| JP | 2005-086838 | A | 3/2005 |
| JP | 2005-225429 | A | 8/2005 |
| JP | 2006-188330 | A | 7/2006 |
| JP | 2010-263717 | A | 11/2010 |

* cited by examiner

FIG. 7
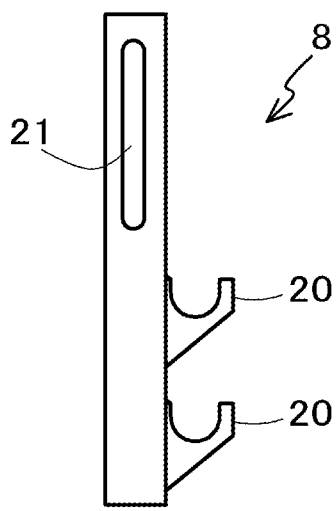
(a)
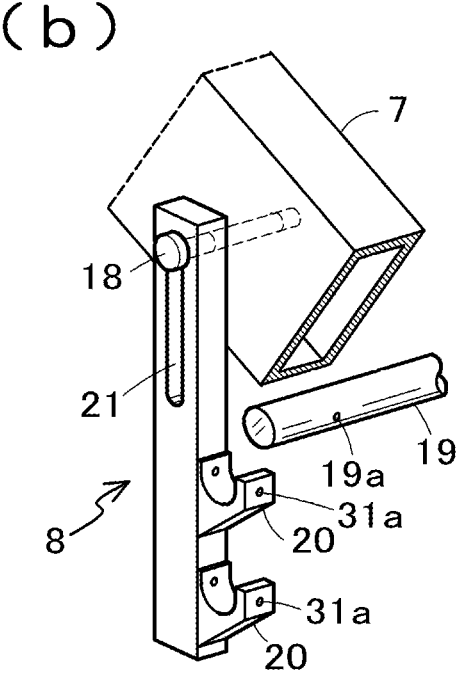
(b)
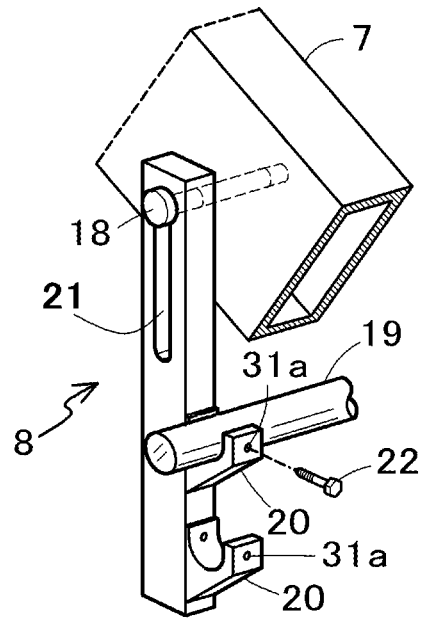
(c)

FIG. 9
(a)
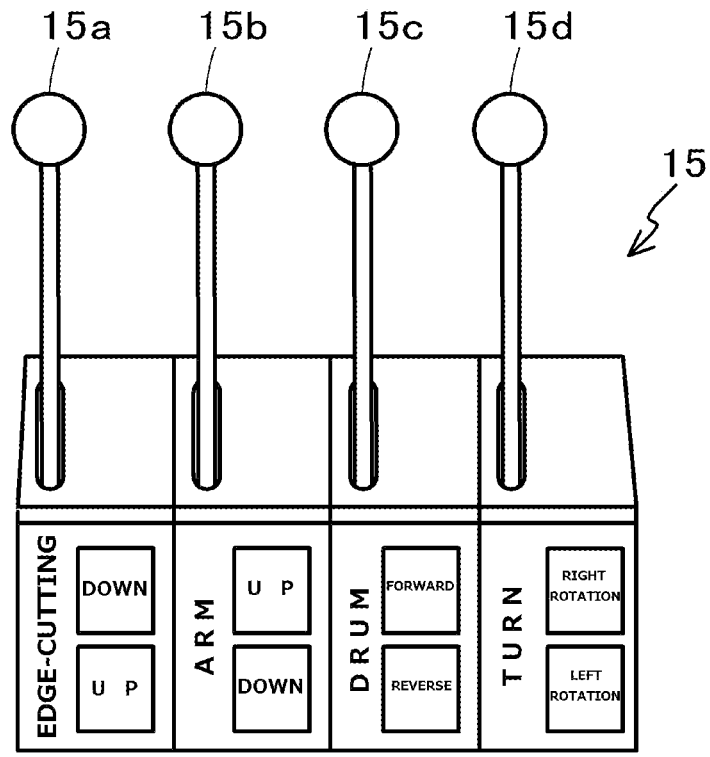
(b)
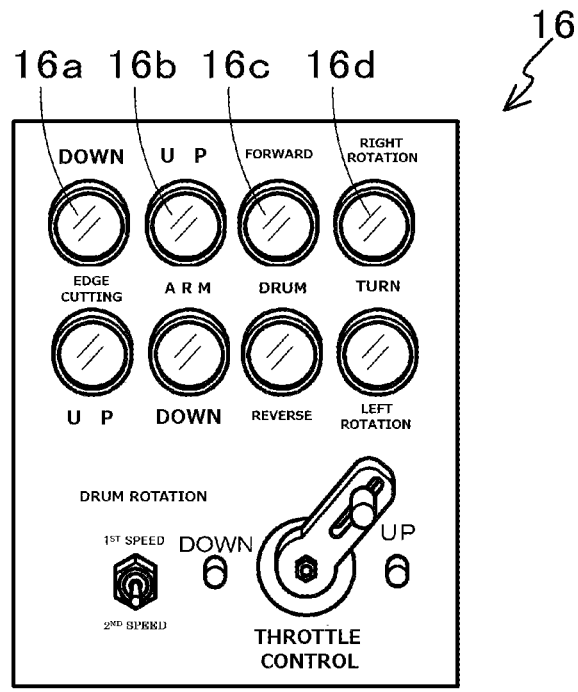

FIG. 12
(a)
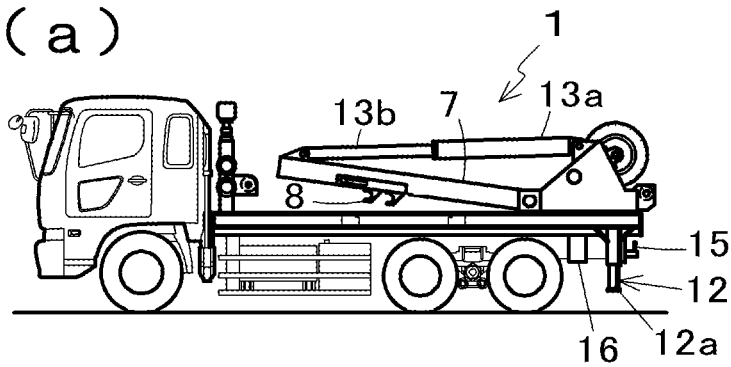
(b)
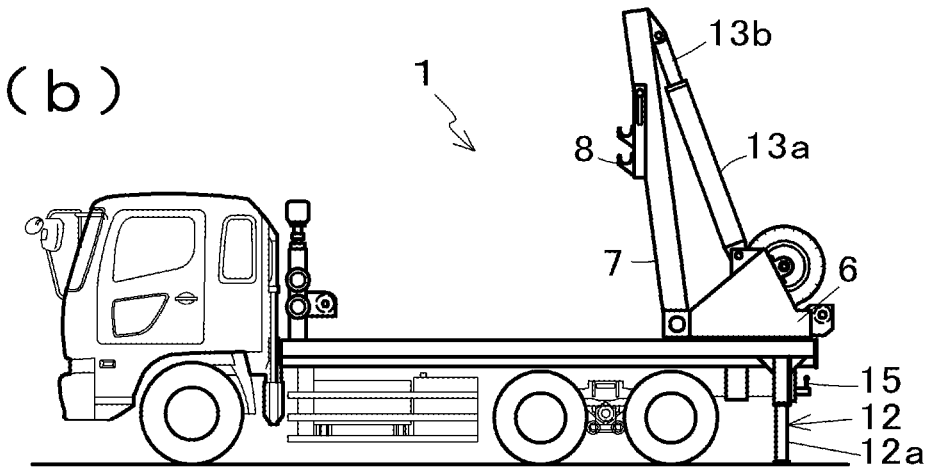
(c)
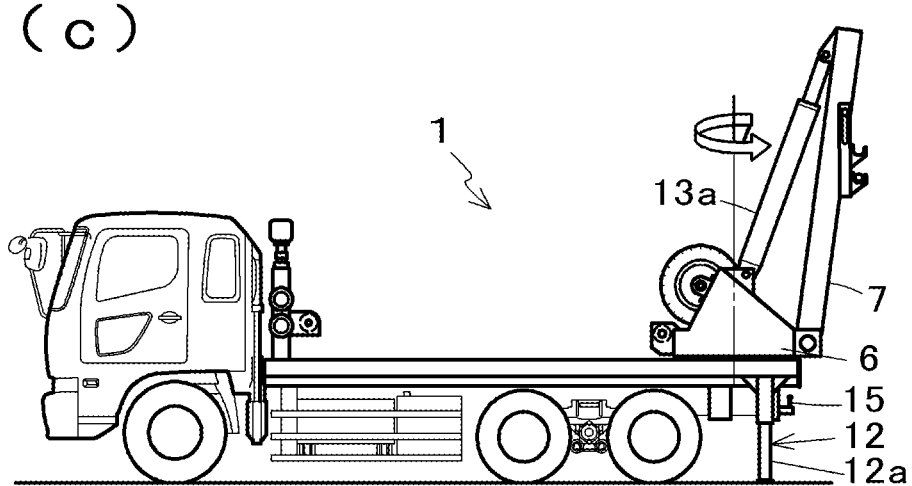

FIG. 13
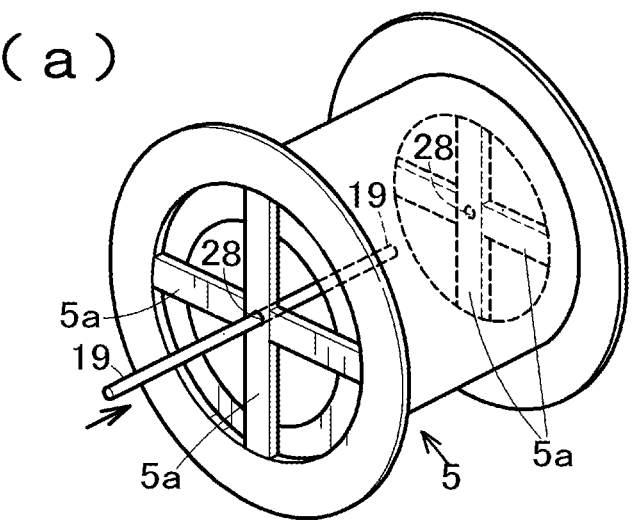
(a)
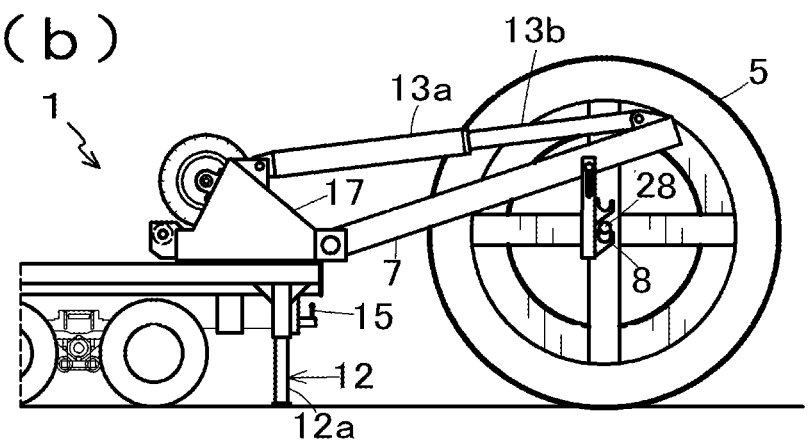
(b)
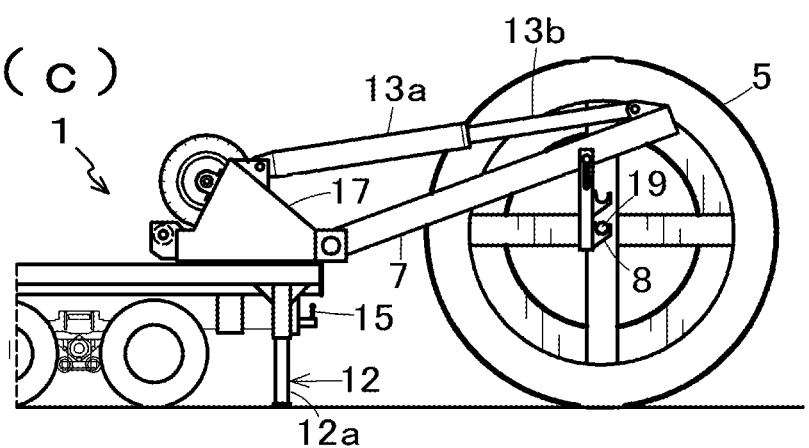
(c)

FIG. 14
(a)
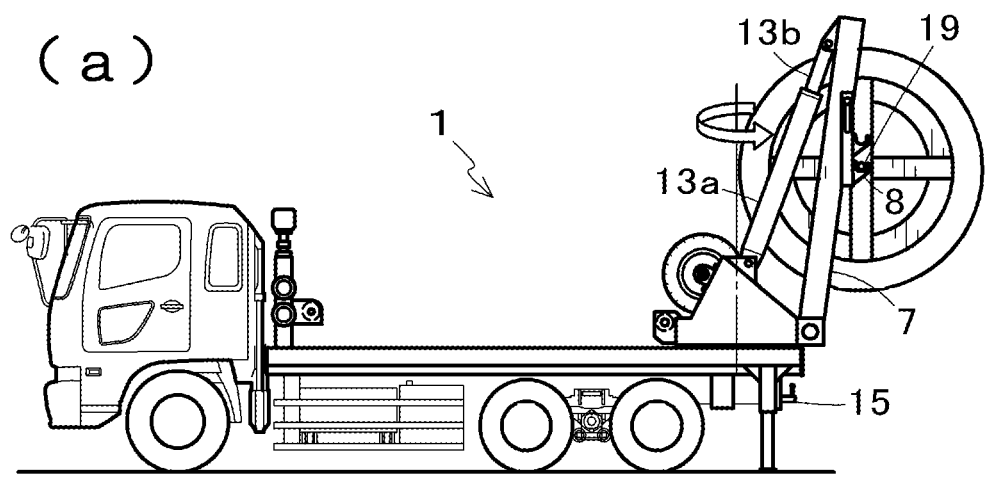
(b)
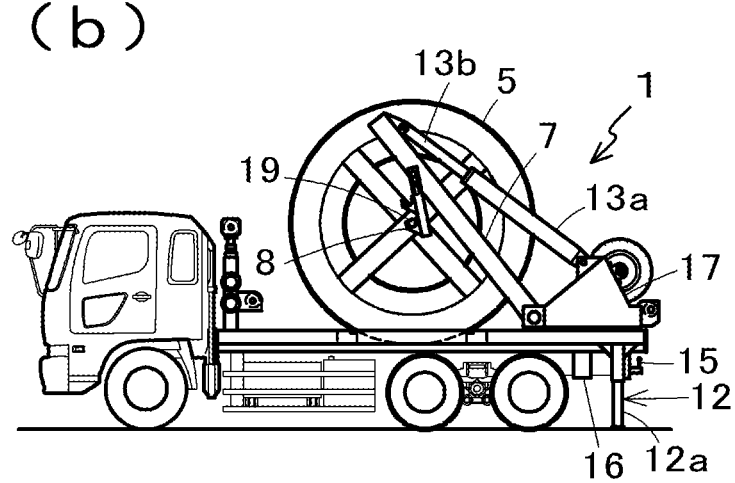

CABLE REELING DEVICE

TECHNICAL FIELD

The present invention relates to a cable reeling device for reeling in a power cable laid in an underground conduit.

BACKGROUND ART

Conventionally, a cable reeling device for reeling in a power cable laid in an underground conduit is known.

Regarding this kind of cable reeling device, there has been a cable extraction method for extracting power cables that are laid in conduits in a plurality of manhole sections and are connected to each other at manhole portions (see FIG. 17). In this cable extraction method, an extraction vehicle 111 and a reel drum 112 are disposed near a manhole 131 on a power cable-extracting side, and a winch vehicle 113 is disposed near a manhole 133 on a side opposite to the extracting side. End portions of a power cable 121 that is to be extracted and a power cable 122 that opposes the power cable 121 are connected to each other within the manhole 132. Also, the power cable 121 and a traction wire 106 are coupled to each other within the manhole 131 on one end side, which is the extracting side, and the power cable 122 and a wire 109 are coupled to each other within the manhole 133 on the side opposite to the extracting side. The traction wire 106, the power cable 121, and the power cable 122 are reeled in by rotating the reel drum 112, and the power cable 121 and the power cable 122 laid in conduits 141 and 142, respectively, are extracted (e.g. Patent Document 1).

PRIOR ART DOCUMENT

Patent Document

[Patent Document 1] JP 2005-86838A

SUMMARY OF INVENTION

Problem to be Solved by the Invention

However, in the conventional cable reeling device (cable extraction method), the traction wire 106, the power cable 121, and the power cable 122 are reeled in by rotating the reel drum 112 using a drive motor. For this reason, when a large extraction force is required to extract the power cables 121 and 122 in the conduits 141 and 142, the power cables 121 and 122 in the conduits 141 and 142 cannot be extracted with the driving force of the drive motor, which hinders the power cable extraction operation.

The present invention has been made in view of the foregoing problem, and an object of the invention is to provide a cable reeling device capable of smoothly rotating a cable drum and enables a power cable extraction operation to be smoothly performed even when a large extraction force is required to extract a cable from an underground conduit.

Means for Solving the Problems

To solve the foregoing problem and achieve the above object, a first aspect of the present invention is a cable reeling device that is to be mounted in a vehicle for reeling in a power cable laid in an underground conduit, the device including: a turn table that is provided on a carrier and is capable of rotating; two arms that are provided in parallel on the turn table and each of which is capable of rotating in a vertical direction around a rotation center that is substantially a connection point between the arm and the turn table; drum support members that are attached to the respective arms and to which a cable drum disposed between the two arms is locked; and a drum rotating device for rotating the cable drum locked to the drum support members, wherein the drum rotating device has: rubber tires with outer circumferential portions having a circular shape thereof being made of elastic rubber, for rotating the cable drum by rotating with the outer circumferential portions being in intimate contact with outer faces of the cable drum locked to the drum support members; a rubber tire fixing shaft that is connected to at least two of the rubber tires and rotates around a rotation axis that is a center axis in a longitudinal direction thereof and a rubber tire rotation driving means for rotating the rubber tire fixing shaft.

According to the present invention, the rotational force of the rubber tires, whose outer circumferential portions are made of elastic rubber, can be directly transmitted to the cable drum by rotating the rubber tires while bringing the rubber tires into intimate contact with outer faces of the cable drum, and the cable drum can be reliably rotated.

In a second aspect of the present invention, the rubber tire rotation driving means can rotate the rubber tire fixing shaft in two directions that are a forward rotation direction and a reverse rotation direction.

According to the present invention, the rubber tire rotation driving means can drive the rubber tire fixing shaft in two directions that are a forward rotation direction and a reverse rotation direction. Thus, when a power cable is extracted, the power cable can be reeled onto the cable drum by forwardly rotating the rubber tires, and when a power cable reeled onto the cable drum is sent out, the power cable can be drawn out from the cable drum by reversely rotating the rubber tire.

In a third aspect of the present invention, the rubber tires are fixed so as to be able to move in a longitudinal direction of the rubber tire fixing shafts.

According to the present invention, since the rubber tires are fixed so as to be able to move in the longitudinal direction of the rubber tire fixing shaft, the rubber tire can be brought into intimate contact with the outer faces of the cable drum even when the horizontal width of the cable drum attached between two arms differs, and the cable drum can be reliably rotated.

A fourth aspect of the present invention is the cable reeling device according to the third aspect, further including a drum rotation driving means for applying a rotational driving force to the cable drum from a side face of the cable drum.

According to the present invention, a pulling force for pulling the power cable is reinforced by rotating the cable drum while bringing the rubber tires into intimate contact with the outer faces of the cable drum, and also rotating the cable drum while applying a rotational driving force to the cable drum from a side face of the cable drum. Thus, a power cable in an underground conduit can be reliably extracted even when a large extraction force is required to extract the power cable.

Effects of the Invention

According to the cable reeling device of the present invention, even when a large extraction force is required to extract a cable from an underground conduit, the cable drum can be smoothly rotated, and a power cable extraction operation can be smoothly performed.

BRIEF DESCRIPTION OF DRAWINGS

FIG. 7(a) is a side view of a drum support member of the cable reeling device.

FIG. 7(b) is a diagram showing a state immediately before a drum shaft is locked to a drum shaft receiver. FIG. 7(c) is a diagram showing a state immediately before the drum shaft is fastened with a shaft fixing bolt.

FIG. 9(a) is a diagram showing a lever operation portion of the cable reeling device. FIG. 9(b) is a diagram showing a remote control operation portion of the cable reeling device.

FIG. 12(a) is a diagram showing a state where a leading end of an arm on the cable reeling device is lowered to a lower portion. FIG. 12(b) is a diagram showing a state where the leading end of the arm of the cable reeling device is raised upward. FIG. 12(c) is a diagram showing a state where the arm of the cable reeling device is rotated by 180 degrees.

FIG. 13(a) is a diagram showing a state where the drum shaft is inserted into a drum shaft hole in the cable drum. FIG. 13(b) is a diagram showing a state immediately before the drum shaft of the cable reeling device according to an embodiment of the present invention is locked to the drum shaft receiver. FIG. 13(c) is a diagram showing a state where the drum shaft of the cable reeling device is locked to the drum shaft receiver.

FIG. 14(a) is a diagram showing a state where the cable drum at a rear portion of the cable reeling device is raised. FIG. 14(b) is a diagram showing a state where the cable drum is placed onto the cable reeling device.

MODES FOR CARRYING OUT THE INVENTION

Figure 3:
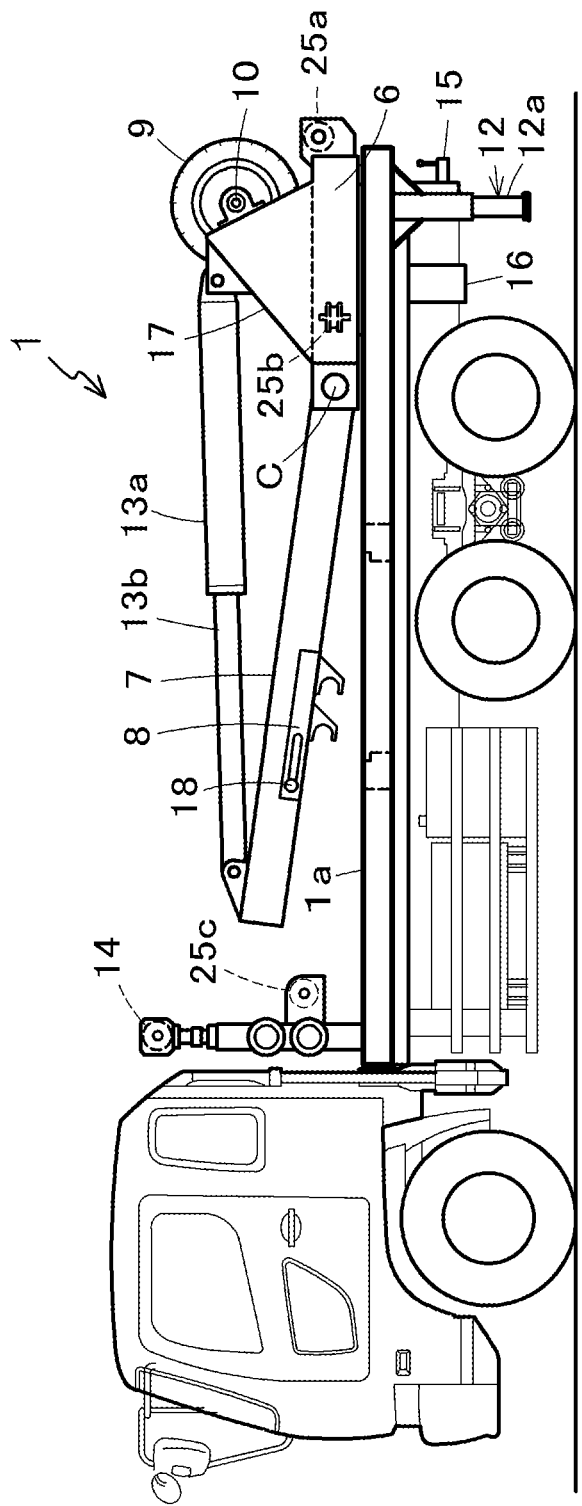
FIG. 3 is a side view of the cable reeling device.
Figure 4:
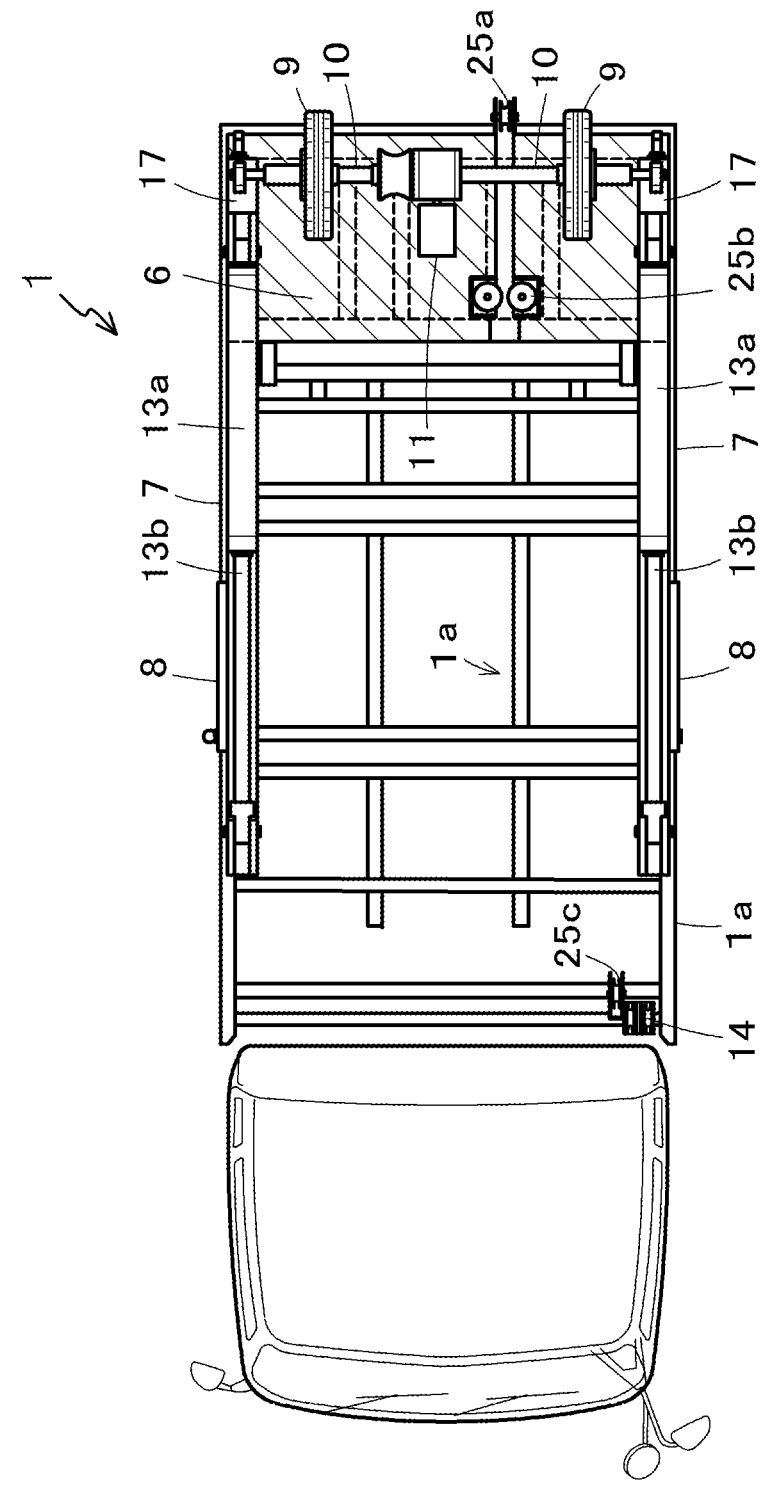
FIG. 4 is a top view of the cable reeling device.
Figure 5:
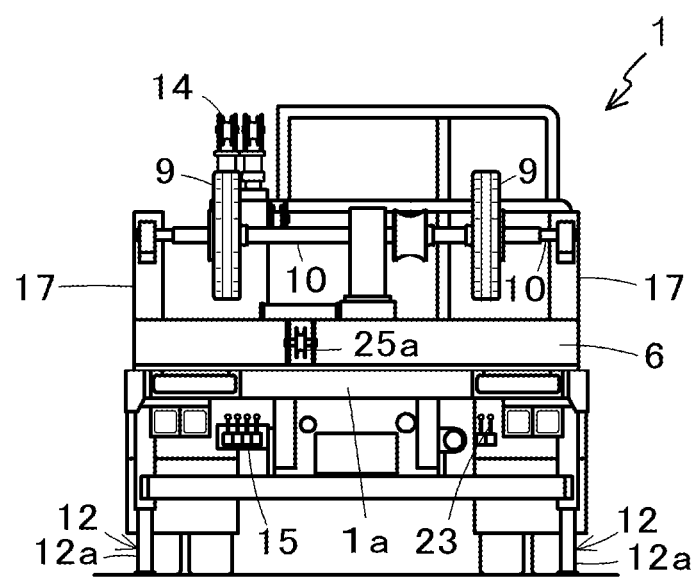
FIG. 5 is a rear view of the cable reeling device.

Hereinafter, a cable reeling device according to an embodiment of the present invention will be described. Here, FIG. 1 is a diagram showing a state of usage of the cable reeling device according to an embodiment of the present invention, FIG. 2 is a perspective view of the cable reeling device, FIG. 3 is a side view of the cable reeling device, FIG. 4 is a top view of the cable reeling device, and FIG. 5 is a rear view of the cable reeling device.

Figure 1:
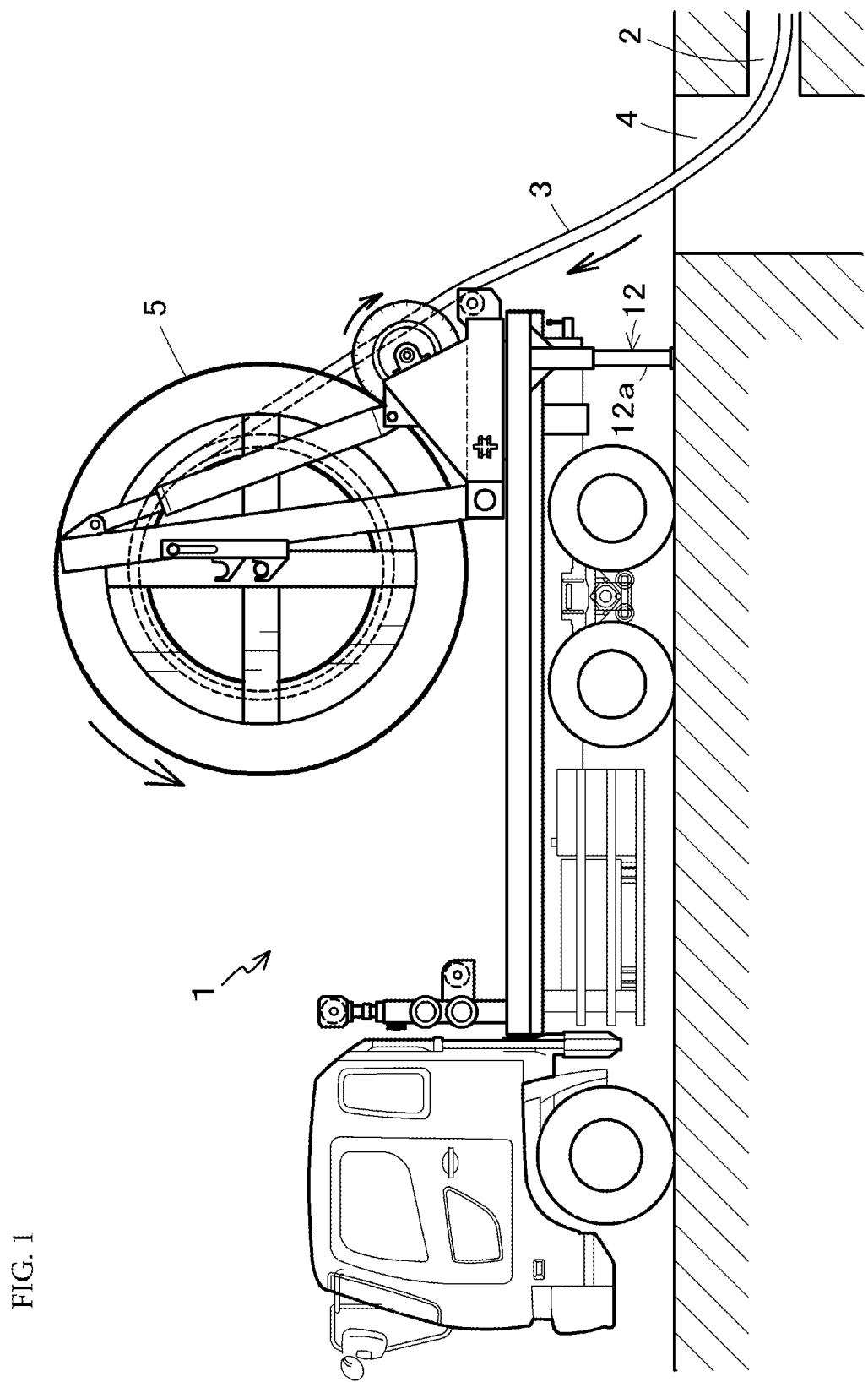
FIG. 1 is a diagram showing a state of usage of a cable reeling device according to an embodiment of the present invention.

A cable reeling device 1 is mounted on a vehicle and reels in a power cable (electric wire) 3 laid in an underground conduit 2 (see FIG. 1). Specifically, the cable reeling device 1 is for extracting the power cable 3 laid in the underground conduit 2, which is buried under the ground, from a manhole 4, and reeling in this power cable 3 using a cable drum 5 installed in the cable reeling device 1.

Figure 2:
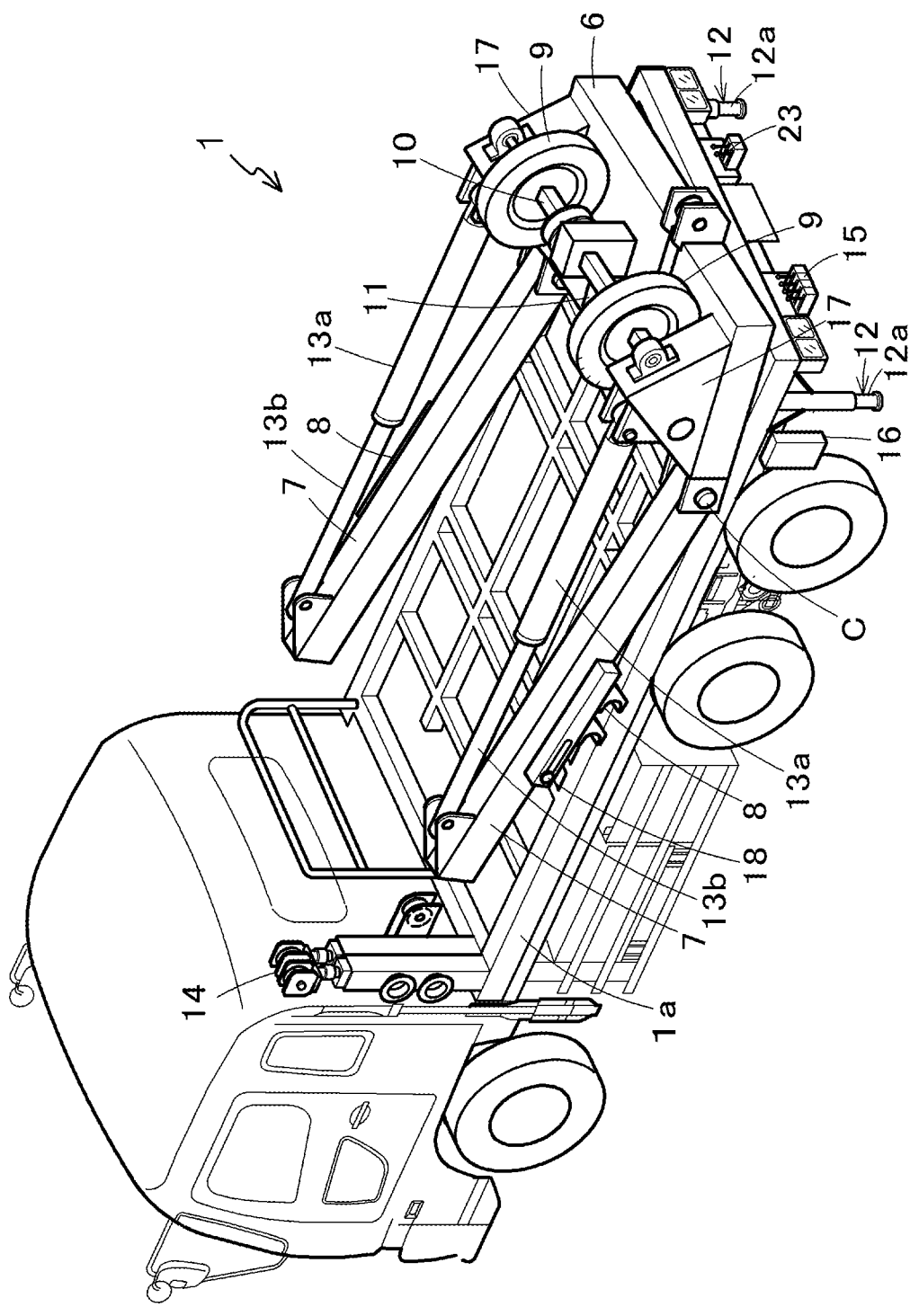
FIG. 2 is a perspective view of the cable reeling device.

As shown in FIG. 2, the cable reeling device 1 has a turn table 6, arms 7, drum support members 8, rubber tires 9, a rubber tire fixing shaft 10, a hydraulic motor 11 (rubber tire rotation driving means), outriggers 12, arm cylinders 13a, an edge-cutting device 14, a lever operation portion 15, and a remote control operation portion 16. Although the outriggers 12 are provided in this embodiment, this need not be the case, and a cable reeling device 1 that is not provided with the outriggers 12 may alternatively be employed.

Figure 6:
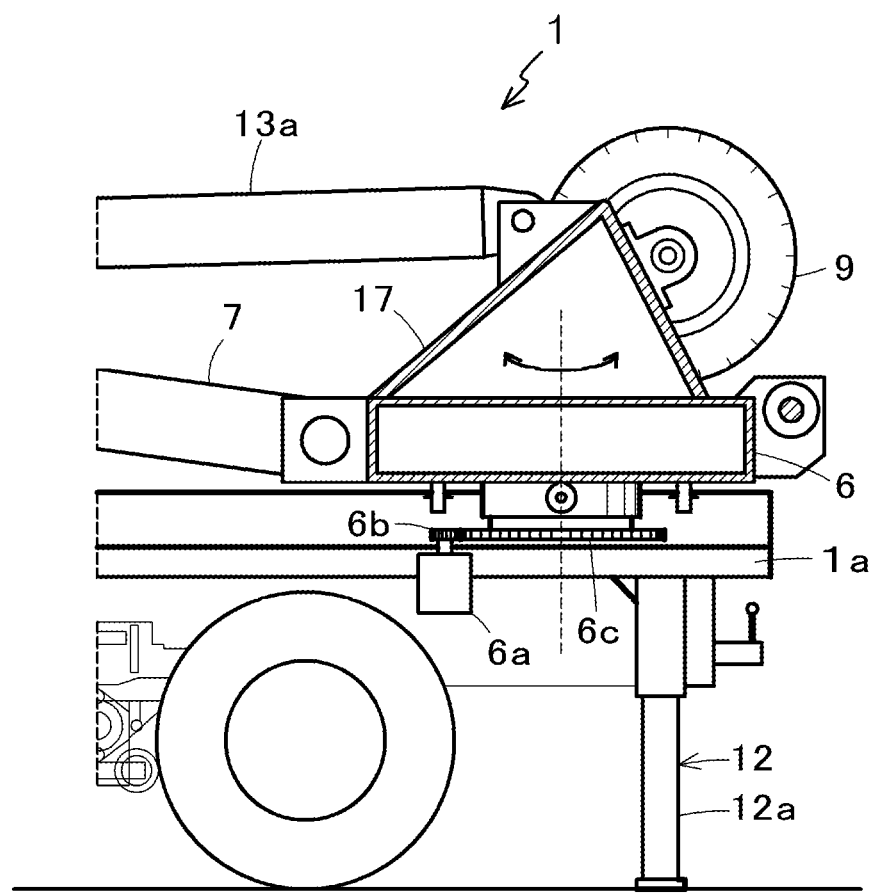
FIG. 6 shows a rotational structure of a turn table of the cable reeling device.

The turn table 6 is provided on a carrier 1a of the cable reeling device 1, and can be rotated substantially horizontally. Specifically, the turn table 6 is provided on a rear side of the carrier 1a of the cable reeling device 1. A motor rotary gear 6b rotates due to a motor rotary shaft of a turn table hydraulic motor 6a being driven to rotate, and this motor rotary gear 6b can rotate the turn table 6 substantially horizontally by 360 degrees via a turn table gear 6c (see FIG. 6). A fixed frame 17 that has a substantially triangular shape is fixed to an upper portion of the turn table 6. Here, FIG. 6 shows a rotational structure of the turn table of the cable reeling device according to an embodiment of the present invention.

Two arms 7 are provided in parallel on the turn table 6, and each of the arms 7 can be rotated in the vertical direction around a rotation center that is a connection point C between the arm 7 and the turn table 6. Specifically, the two arms 7 are provided in parallel with a gap, the width of which is substantially the same as the horizontal width of the carrier 1a on the turn table 6, and are connected to left and right leading ends of the turn table 6. The arms 7 can be vertically pivoted in the vertical direction around the respective rotation centers that are the respective connection points C between the arms 7 and the turn table 6, by moving arm pistons 13b, which protrude from the inside of the respective arm cylinders 13a. Note that, in this embodiment, the arms 7 are rotated around the respective rotation centers that are the connection points C between the arms 7 and the turn table 6. However, this need not be the case, and the arms 7 may alternatively be rotated around respective rotation centers that are points (substantial connection points) near the connection points C between the arms 7 and the turn table 6. Also, in this embodiment, two arms 7 are provided in parallel on the turn table 6. However, this need not be the case, and two or more arms 7 may be provided in parallel on the turn table 6.

The drum support members 8 are attached to (outer side faces of) the arms 7, and lock the cable drum 5 arranged between the two arms 7. Specifically, the drum support members 8 have a substantially rectangular shape, and are removably attached to the respective arms 7 with arm fixing pins 18 (see FIG. 7). Each of the drum support members 8 has two drum shaft receivers 20 for locking a drum shaft 19 that are formed at upper and lower portions of a side face, and has a drum support member fixing position adjustment hole 21, which allows a fixing position to be set between the drum support member 8 and the arm 7, in the substantially rectangular shape of the drum support member 8. After the drum shaft 19 is locked to one of the drum shaft receivers 20, a shaft fixing bolt 22 is inserted into a drum shaft fixing bolt insertion hole 19a in the drum shaft 19 via a drum shaft receiver fixing bolt insertion hole 31a formed in the drum shaft receiver 20, and the drum shaft 19 is fastened with the shaft fixing bolt 22. As a result, the drum shaft 19 can be firmly attached to the drum support member 8. Here, FIG. 7(a) is a side view of the drum support member of the cable reeling device according to an embodiment of the present invention, FIG. 7(b) is a diagram showing a state immediately before the drum shaft is locked to the drum shaft receiver, and FIG. 7(c) is a diagram showing a state immediately before the drum shaft is fastened with the shaft fixing bolt.

The rubber tires 9 have a circular shape, and outer circumferential portions thereof are made of butadiene rubber. The cable drum 5 can be rotated by rotating the rubber tires 9 while bringing the outer circumferential portions thereof into intimate contact with outer faces of the cable drum 5 that is locked to the drum support members 8. Here, in this embodiment, the rubber tires 9 are tires used in automobiles. Although, in this embodiment, the material of the outer circumferential portions is butadiene rubber, this need not be the case, and the material may alternatively be any kind of elastic rubber such as isoprene rubber and butyl rubber. Also, although, in this embodiment, automobile tires that are hollow inward of the outer circumferential portions are used, this need not be the case, and tires that are not hollow inward of the outer circumferential portions may alternatively be used. Two rubber tires 9 are provided, and these two rubber tires 9 are movably connected and fixed to the rubber tire fixing shaft 10 at their center axes. Although the present embodiment describes that the rubber tires 9 can move in the longitudinal direction of the rubber tire fixing shaft 10, this need not be the case. The rubber tires 9 may be fixed at fixed positions on the rubber tire fixing shafts 10, and need not be able to move in the longitudinal direction of the rubber tire fixing shaft 10. Although two rubber tires 9 are provided in the present embodiment, a plurality of rubber tires 9 more than two, e.g. three or four rubber tires 9, may be provided. The rubber tire fixing shaft 10 can be rotated around respective rotation axes that are center axes in the longitudinal direction thereof, by a rotational driving force of the hydraulic motor 11 (see FIG. 4). Further, the rubber tires 9 rotate due to the rubber tire fixing shaft 10 rotating, and the cable drum 5 that is in intimate contact with the outer faces of the rubber tires 9 can be rotated by the rotational force of the rubber tires 9. Note that the hydraulic motor 11 can rotate the rubber tire fixing shaft 10 in two directions, which are a forward rotation (clockwise rotation) direction and a reverse rotation (counterclockwise) rotation direction. Here, a drum rotating device is that rotates the cable drum 5 locked to the drum support members 8 is constituted by the rubber tires 9, the rubber tire fixing shaft 10, and the hydraulic motor 11. However, this need not be the case, and a drum rotating device may alternatively be constituted by any other elements if the drum rotating device rotates the cable drum 5 locked to the drum support members 8.

The outriggers 12 support the rear side of the cable reeling device 1 due to outrigger cylinders 12a extending downward. Thus, even if the cable drum 5 placed on the carrier 1a of the cable reeling device 1 is rotated, the cable reeling device 1 does not move forward or backward and can be stabilized.

Figure 8:
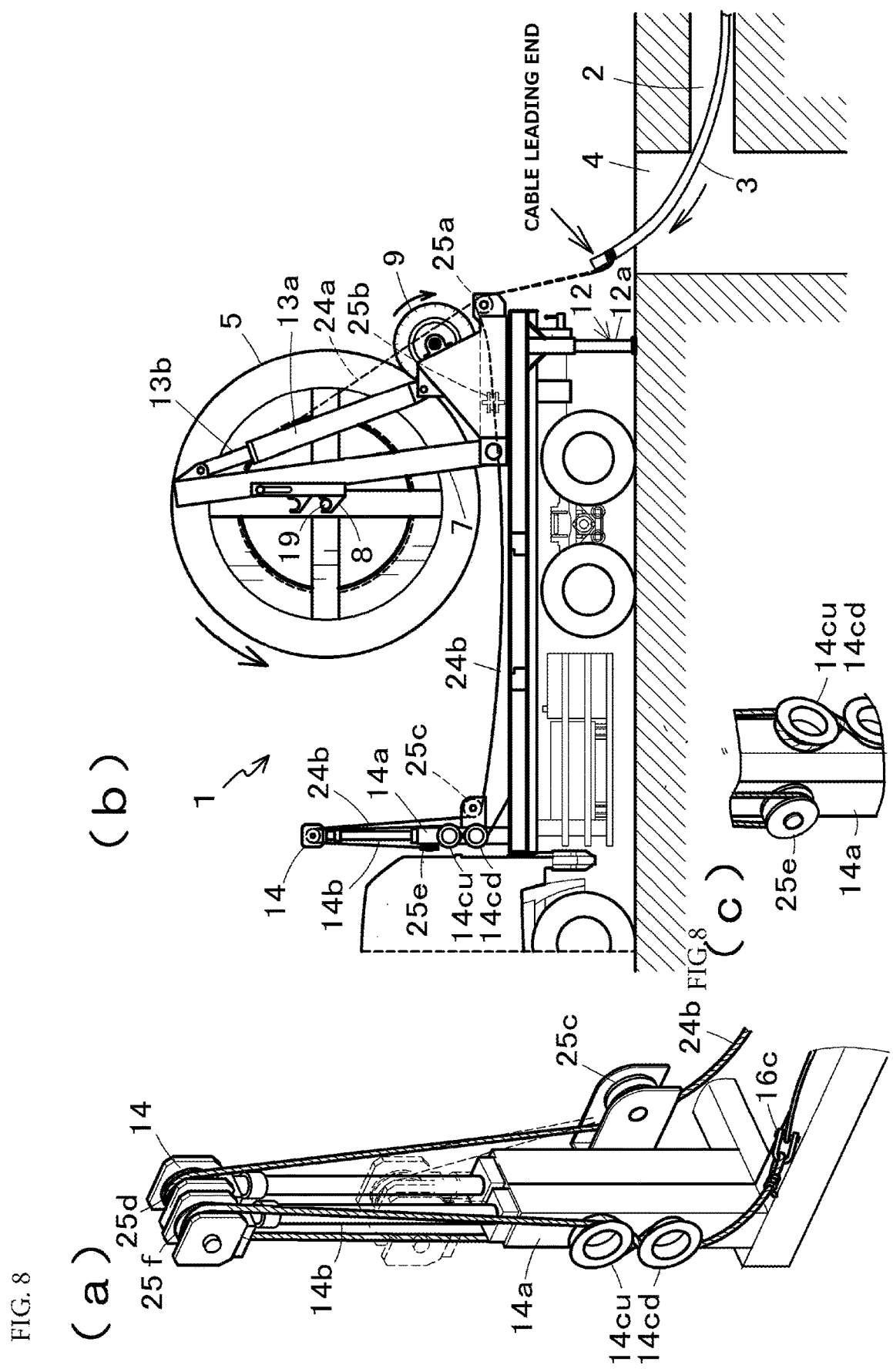
FIG. 8(a) is a diagram showing an edge-cutting device of the cable reeling device.
FIG. 8(b) is a diagram showing an operation using the edge-cutting device of the cable reeling device.
FIG. 8(c) is a front perspective view showing an edge-cutting device back-side intermediate roller of the edge-cutting device of the cable reeling device.

The edge-cutting device 14 is used to pull up the power cable 3 laid in the underground conduit 2 (see FIG. 8). That is to say, at the beginning of pulling up the power cable 3 laid in the underground conduit 2, the power cable 3 in the underground conduit 2 is long, a frictional force also acts, and thus a large pulling force is required. For this reason, the power cable 3 is pulled up using the edge-cutting device 14. This edge-cutting device 14 can expand and contract in the vertical direction due to an edge-cutting piston 14b in an edge-cutting cylinder 14a moving in the vertical direction. To pull up the power cable 3 from the underground conduit 2 using the edge-cutting device 14, firstly, a leading end of a wire 24a is locked to the cable drum 5, a leading end of a wire 24b is locked to the edge-cutting device 14, and the other end of the wire 24b is attached to a leading end of the power cable 3 in the underground conduit 2. Specifically, a leading end of the wire 24a is locked to a wire locking portion (not shown) of the cable drum 5 (an end portion of a reeling portion for reeling in the power cable 3). A leading end of the wire 24b is locked to a carrier wire locking portion 16e on the carrier 1a near the edge-cutting device 14 via guide rollers 25a, 25b, and 25c, an edge-cutting device upper-end left roller 25d (see FIG. 8(a)) at an upper end of the edge-cutting device 14, an edge-cutting device back-side intermediate roller 25e (see FIG. 8(c)) on the back side of the edge-cutting device 14, an edge-cutting device upper-end right roller 25f (see FIG. 8(a)) at an upper end of the edge-cutting device 14, and two wire locking portions 14cu and 14cd at lower portions of a side face of the edge-cutting device 14. The other end of the wire 24b is attached to the leading end of the power cable 3 in the underground conduit 2. Here, the wire 24b is locked in an "8" shape to the two wire locking portions 14cu and 14cd at the lower portions of the side face of the edge-cutting device 14, from a rear face of the wire locking portion 14cu to a portion between the two wire locking portions 14cu and 14cd, a front face of the wire locking portion 14cd, a lower face of the wire locking portion 14cd, a portion between the two wire locking portions 14cu and 14cd, a front face of the wire locking portion 14cu, an upper face of the wire locking portion 14cu, a portion between the two wire locking portions 14cu and 14cd, and then to the rear face of the wire locking portion 14cu. Then, the edge-cutting piston 14b in the edge-cutting cylinder 14a is moved upward with the leading end portion of the wire 24b, to which the power cable 3 is attached, locked to the carrier wire locking portion 16e, and thus the power cable 3 attached to the rear end of the wire 24b is pulled out from the underground conduit 2. This edge-cutting piston 14b is operated by hydraulic pressure, and can pull the power cable 3 out of the underground conduit 2 with a pulling force of 8$t$. Accordingly, the power cable 3 can be pulled up with a large pulling force, the edge-cutting piston 14b can be arranged while saving space, and the power cable 3 can be quietly pulled up, compared with the case of pulling up the power cable 3 laid in the underground conduit 2 using a jack or the like. After the power cable 3 is pulled out by 6.0 m (3.0 m×2 (corresponding to the length of two edge-cutting pistons 14b)) due to the edge-cutting piston 14b in the edge-cutting cylinder 14a of the edge-cutting device 14 moving upward, the edge-cutting piston 14b in the edge-cutting cylinder 14a of the edge-cutting device 14 is moved downward, the wire 24b attached to the leading end of the power cable 3 in the underground conduit 2 is removed from the power cable 3, and the wire 24b is attached to the power cable 3 at a position 6.0 m rearward from the position at which the wire 24b was removed therefrom. Then, the edge-cutting piston 14b is moved upward again, and thus the power cable 3 attached to the rear end of the wire 24b is pulled out from the underground conduit 2. This operation is performed every 6.0 m of the wire 24b, and is repeated for the length with which the power cable 3 attached to the rear end of the wire 24b comes out from the manhole 4. When the power cable 3 attached to the rear end of the wire 24b has come out from the manhole 4, the power cable 3 is then attached to the rear end of the wire 24a in place of the rear end of the wire 24b. Then, due to the cable drum 5 being rotated by the rubber tires 9, the wire 24a is reeled onto the cable drum 5, and the power cable 3 attached to the wire 24a can be reeled onto the cable drum 5. Thus, at the beginning of pulling up the power cable 3 laid in the underground conduit 2, the power cable 3 laid in the underground conduit 2 can be pulled up with a sufficient pulling force using the edge-cutting device 14, and thus, the power cable 3 can be smoothly pulled up. Here, FIG. 8(a) is a diagram showing the edge-cutting device of the cable reeling device according to an embodiment of the present invention, FIG. 8(b) is a diagram showing an operation using the edge-cutting device of the cable reeling device, and FIG. 8(c) is a front perspective view showing the edge-cutting device back-side intermediate roller of the edge-cutting device of the cable reeling device.

The lever operation portion 15 is provided on a right rear face of the cable reeling device 1 and has an edge-cutting device operation lever 15a, an arm operation lever 15b, a drum operation lever 15c, and a turn table operation lever 15d. An operation to move the edge-cutting piston 14b of the edge-cutting device 14 up and down can be performed using the edge-cutting device operation lever 15a, an operation to move the arm pistons 13b of the arms 7 up and down can be performed using the arm operation lever 15b. An operation to forwardly and reversely rotate the rubber tires 9 of the cable drum 5 can be performed using the drum operation lever 15c. An operation to rotate the turn table 6 leftward and rightward can be performed using the turn table operation lever 15d (see FIG. 9(a)). The remote control operation portion 16 is a removable operation remote controller and is provided in a remote controller box on a right rear side face of the cable reeling device 1, and has an edge-cutting device operation switch 16a, an arm operation switch 16b, a drum operation switch 16c, and a turn table operation switch 16d. The same operations as those of the lever operation portion 15 can be performed using the respective switches (see FIG. 9(b)). Here, FIG. 9(a) is a diagram showing the lever operation portion of the cable reeling device according to an embodiment of the present invention, and FIG. 9(b) is a diagram showing the remote control operation portion of the cable reeling device. An outrigger operation portion 23 is provided on a left rear face of the cable reeling device 1, and an operation to move the outriggers 12 up and down can be performed using an operation lever (not shown (detailed diagram)).

Next, a booster device 26 of the cable reeling device 1 will be described. Here, FIG. 10(a) is a front view of the booster device of the cable reeling device according to an embodiment of the present invention. FIG. 10(b) is a front perspective view of the booster device of the cable reeling device. FIG. 10(c) is an exploded perspective view of the cable drum and the booster device. FIG. 10(d) is a front view of the booster device attached to the cable drum. FIG. 10(e) is a back view of the booster device attached to the cable drum. The booster device 26 is used to enhance the pulling force for pulling the power cable 3. That is to say, since the length of the power cable 3 in the underground conduit 2 is about 300 m, and a frictional force also occurs between the underground conduit 2 and the power cable 3 when the power cable 3 in the underground conduit 2 is pulled up, a considerably large pulling force is required to pull up the power cable 3 in some cases. In such cases, the power cable 3 is pulled up using the booster device 26.

The booster device 26 (drum rotation driving means) has a hydraulic motor 26a, a motor planetary gear 26b, and a booster internal gear 26c, and applies a rotational driving force to the cable drum 5 from a side face of the cable drum 5. This booster device 26 is attached to one of the arm 7 due to the drum support member 8 being removed together with the arm fixing pin 18 from the arm 7, then the drum shaft 19 being inserted into a space above a drum shaft mount portion 29 of the booster device 26, and the arm fixing pin 18 being inserted into a booster device fixing hole 27 in the booster device 26. When the booster device 26 is attached to the arm 7, booster drum locking portions 26d of the booster device 26 are inserted into a space formed by a drum cross-shaped portion 5a provided on an outer circumferential side of a drum shaft hole 28 (see FIG. 13(a)) in the cable drum 5. Thus, the booster device 26 is attached to the cable drum 5 with the booster drum locking portions 26d of the booster device 26 fitted to the drum cross-shaped portion 5a of the cable drum 5. Upon the booster drum locking portions 26d rotating, the drum cross-shaped portion 5a is pushed in the rotational direction by the booster drum locking portion 26d, and thus the cable drum 5 can be rotated. Specifically, in this booster device 26, the motor planetary gear 26b connected to a motor shaft of the hydraulic motor 26a rotates due to the hydraulic motor 26a being driven, and the booster internal gear 26c rotates due to the rotation of the motor planetary gear 26b. Then, due to the booster internal gear 26c rotating and the booster drum locking portions 26d rotating, the drum cross-shaped portion 5a is pushed in the rotational direction by the booster drum locking portions 26d, and the cable drum 5 can be rotated.

Figure 11:
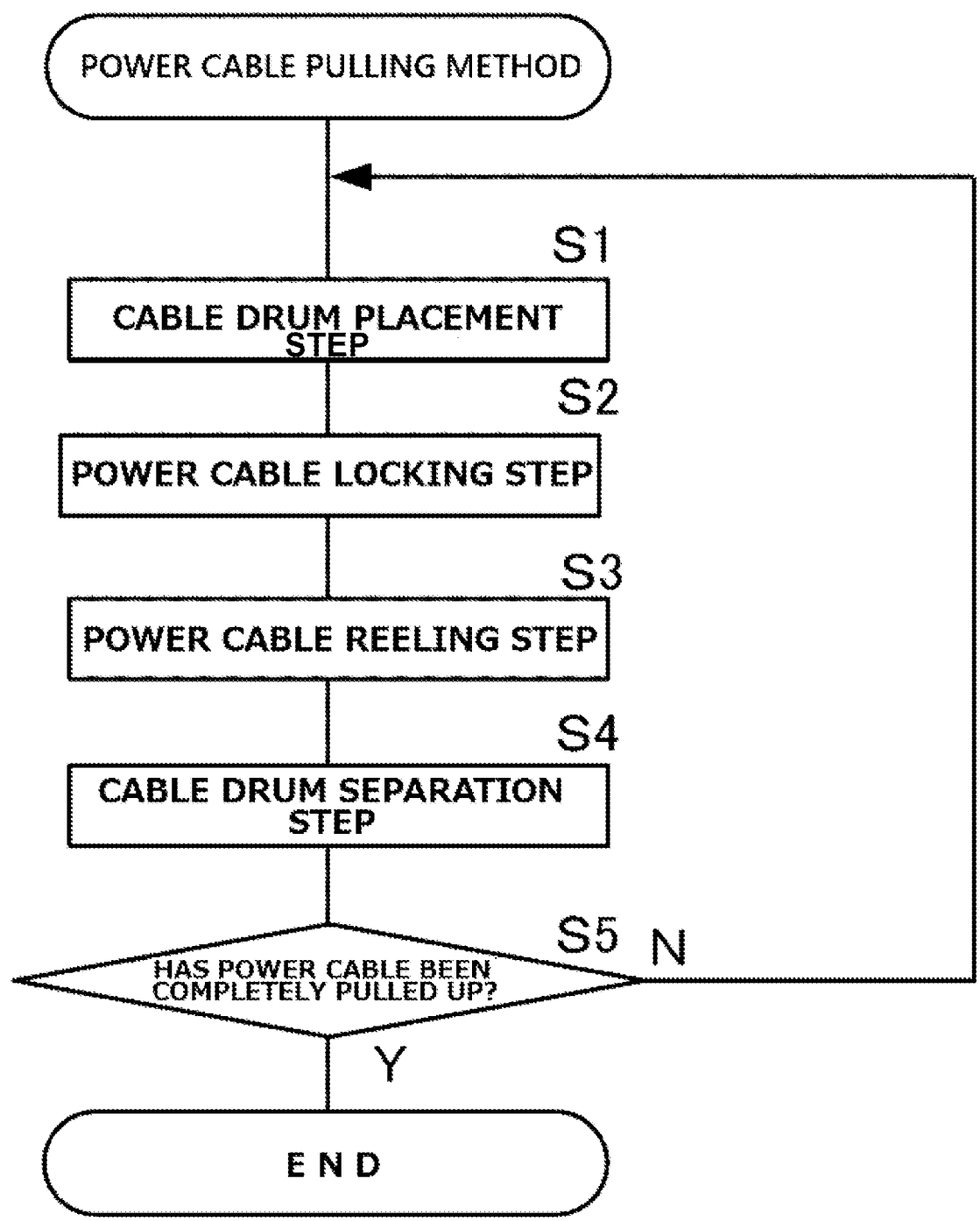
FIG. 11 is a flowchart of a power cable pulling method using the cable reeling device according to an embodiment of the present invention.
Figure 15:
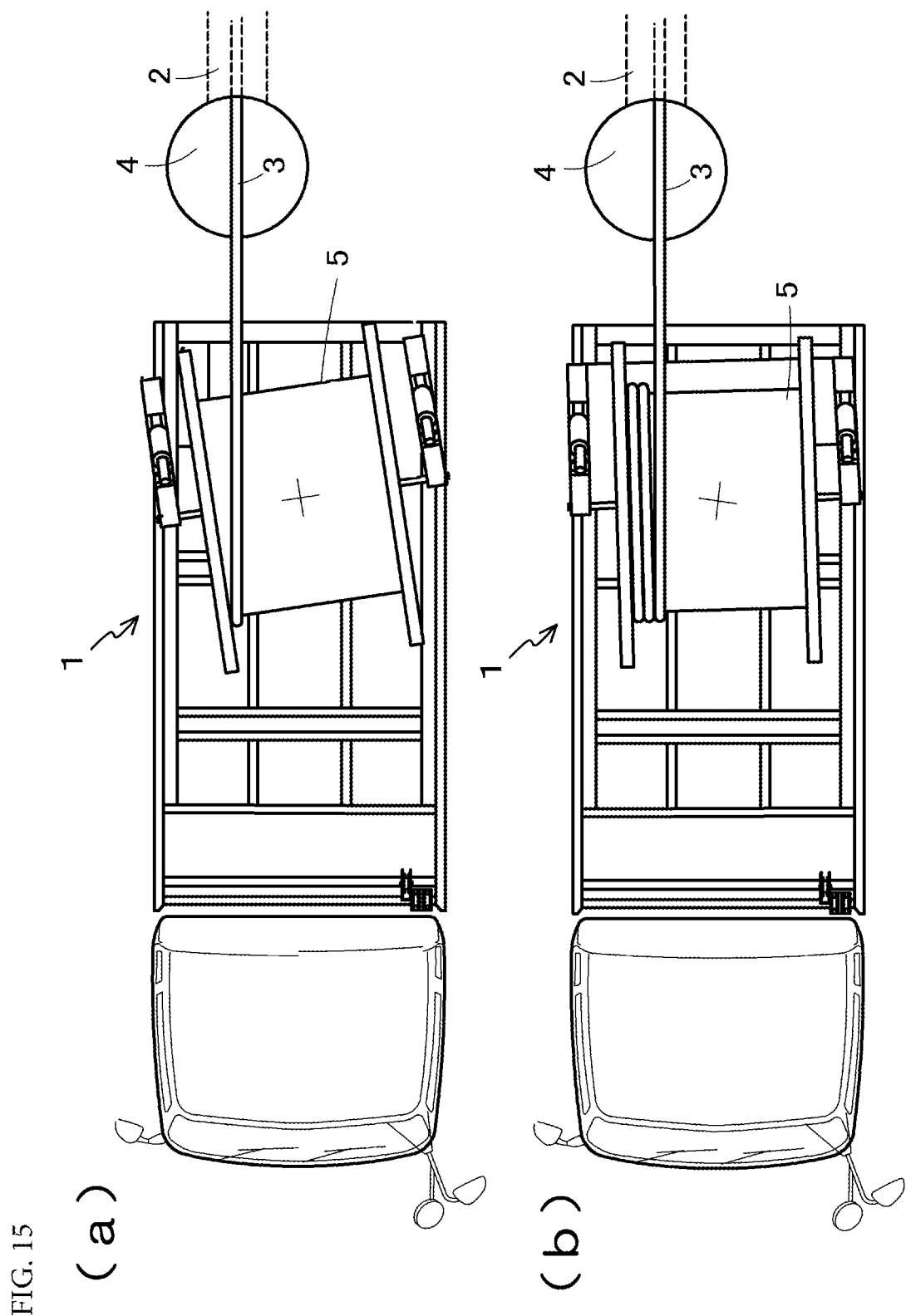
FIG. 15(a) is a diagram showing an initial stage of the power cable being reeled onto the cable drum by the cable reeling device.
FIG. 15(b) is a diagram showing a stage in the process of the power cable being reeled onto the cable drum by the cable reeling device.

Next, a method for pulling up a power cable (wire) 3 using the cable reeling device 1 according to this embodiment will be described with reference to FIGS. 11 to 16. Here, FIG. 11 is a flowchart of a power cable pulling method using the cable reeling device according to an embodiment of the present invention.

To reel in the power cable 3 using the cable reeling device 1, the cable reeling device 1 is driven to a reeling location for the power cable (wire) 3. Here, when the cable reeling device 1 travels, that is, until the cable reeling device 1 arrives at the reeling location for the power cable 3, the leading end of each arm 7 is lowered (see FIG. 12(a)). This cable reeling device 1 can lower the leading end of each arm 7 by causing the arm piston 13b to protrude from the arm cylinder 13a to the outside. After the cable reeling device 1 arrives at the reeling location for the power cable 3, processing in S1 is carried out. Here, FIG. 12(a) is a diagram showing a state where the leading end of the arm on the cable reeling device according to an embodiment of the present invention is lowered.

In S1, a cable drum placement step is carried out. In this cable drum placement step, the cable drum 5 is placed onto the carrier 1a of the cable reeling device 1. Specifically, the cable drum 5 is placed onto the carrier 1a of the cable reeling device 1 in the following procedure while operating the arm operation lever 15b (arm operation switch 16b) and the turn table operation lever 15d (turn table operation switch 16d).

(1) The leading end of each arm 7 that has been lowered to the carrier 1 of the cable reeling device 1 is raised (FIG. 12(b)) and, in this state, the turn table 6 is rotated substantially horizontally by 180 degrees (see FIG. 12(c)). The leading end of the arm 7 is raised due to the arm piston 13b in the arm cylinder 13a being moved inward of the arm cylinder 13a. When the leading end of the arm 7 is raised, the outrigger cylinder 12a of each outrigger 12 is extended downward to support the rear side of the cable reeling device 1. Thus, the cable reeling device 1 does not move forward or backward and can be stabilized. Here, FIG. 12(b) is a diagram showing a state where the leading end of the arm of the cable reeling device according to an embodiment of the present invention is raised, and FIG. 12(c) is a diagram showing a state where the arm of the cable reeling device is rotated by 180 degrees.

(2) Next, the drum shaft 19 is inserted into the drum shaft holes 28 that are open at the center of the cable drum 5 (see FIG. 13(a)). Here, if the diameter of the drum shaft 19 is smaller than the diameter of the drum shaft holes 28, a drum spacer (not shown) and an anti-slipping ring (not shown) are attached from the two ends of the drum shaft 19 after the drum shaft 19 has been inserted to the drum shaft holes 28. Thus, a gap between the drum shaft 19 and each drum shaft hole 28 can be eliminated, and the drum shaft 19 can be attached to the drum shaft holes 28 such that the drum shaft 19 does not become unstable. Note that, in the present embodiment, the drum shaft 19 is inserted into the drum shaft holes 28 in the cable drum 5 after the leading end of the arm 7 of the cable reeling device 1 has been rotated substantially horizontally by 180 degrees. However, this need not be the case, and the leading end of the arm 7 of the cable reeling device 1 may be rotated substantially horizontally by 180 degrees after the drum shaft 19 has been inserted into the drum shaft holes 28 in the cable drum 5.

(3) The leading end of each arm 7 that has been rotated by 180 degrees and faces rearward is lowered (see FIG. 13(b)). Here, when the leading end of the arm 7 is lowered, the leading end of the arm 7 is lowered such that the position of the drum shaft holes 28 in the cable drum 5 comes to the position of one of the drum shaft receivers 20 of the drum support member 8. The drum support member 8 attached to the arm 7 has a size corresponding to the cable drum 5. Here, FIG. 13(b) is a diagram showing a state immediately before the drum shaft of the cable reeling device according to an embodiment of the present invention is locked to the drum shaft receiver.

(4) After the leading end of the arm 7 has been lowered, the drum shaft 19 inserted into the drum shaft holes 28 is locked to the corresponding drum support member 8 (see FIG. 13(c)). Thus, the cable drum 5 is attached between the two arms 7. Specifically, after the drum shaft 19 has been locked to the drum shaft receiver 20 of the drum support member 8, the shaft fixing bolt 22 is inserted into the drum shaft fixing bolt insertion hole 19a in the drum shaft 19 via the drum shaft receiver fixing bolt insertion hole 31a formed in the drum shaft receiver 20 (see FIG. 7(c)). Thus, the cable drum 5 is attached between the two arms 7. Here, FIG. 13(c) is a diagram showing a state where the drum shaft of the cable reeling device according to an embodiment of the present invention is locked to the drum shaft receiver.

(6) After the cable drum 5 has been attached between the two arms 7, the drum shaft 19 (including the cable drum 5) locked to the drum support member 8 is moved to the carrier 1a of the cable reeling device 1. Specifically, the leading end of each arm 7 is raised until the height of the lower end of the cable drum 5 attached between the two arms 7 is higher than the height of the carrier 1a (see FIG. 14(a)). Then, after the turn table 6 has been rotated by 180 degrees, the leading end of each arm 7 is lowered such that the cable drum 5 attached between the two arms 7 is placed onto the carrier 1a (see FIG. 14(b)). Thus, the cable drum 5 is placed onto the carrier 1a of the cable reeling device 1. Then, the procedure proceeds to S2.

In S2, a power cable locking step is carried out. In this power cable locking step, the leading end of the wire 24a to which the power cable 3 is attached is locked to the cable drum 5. Specifically, firstly, the leading end of the wire 24a is locked to the cable drum 5, the leading end of the wire 24b is locked to the edge-cutting device 14, and the other end of the wire 24b is attached to the leading end of the power cable 3 in the underground conduit 2. That is to say, the leading end of the wire 24a is locked to a wire locking portion (not shown) of the cable drum 5 (an end portion of a reeling portion for reeling in the power cable 3). The leading end of the wire 24b is locked to a carrier wire locking portion 16e on the carrier 1a near the edge-cutting device 14 via the guide rollers 25a, 25b, and 25c, the edge-cutting device upper-end left roller 25d (see FIG. 8(a)) at the upper end of the edge-cutting device 14, the edge-cutting device back-side intermediate roller 25e (see FIG. 8(c)) on the back side of the edge-cutting device 14, the edge-cutting device upper-end right roller 25f (see FIG. 8(a)) at the upper end of the edge-cutting device 14, and the two wire locking portions 14cu and 14cd at the lower portions of the side face of the edge-cutting device 14. The other end of the wire 24b is attached to the leading end of the power cable 3 in the underground conduit 2. After the power cable 3 has been pulled out by 6.0 m (3.0 m×2 (corresponding to the length of two edge-cutting pistons 14b)) due to the edge-cutting piston 14b in the edge-cutting cylinder 14a of the edge-cutting device 14 moving upward, the edge-cutting piston 14b in the edge-cutting cylinder 14a of the edge-cutting device 14 is moved downward, the wire 24b attached to the leading end of the power cable 3 in the underground conduit 2 is removed from the power cable 3, and the wire 24b is attached to the power cable 3 at a position 6.0 m rearward from the position at which the wire 24b was removed therefrom. Then, the edge-cutting piston 14b is moved upward again, and thus the power cable 3 attached to the rear end of the wire 24b is pulled out from the underground conduit 2. This operation is performed every 6.0 m of the wire 24b, and is repeated for the length with which the power cable 3 attached to the rear end of the wire 24b comes out from the manhole 4. When the power cable 3 attached to the rear end of the wire 24b has come out from the manhole 4, the power cable 3 is attached to the rear end of the wire 24a in place of the rear end of the wire 24b (see FIG. 8(b)). Then, the procedure proceeds to S3.

In S3, a power cable reeling step is carried out. In this power cable reeling step, the power cable 3 (wire 24a) is reeled onto the cable drum 5 by rotating the rubber tires 9 forwardly (clockwise). Specifically, due to the drum operation lever 15c (or the drum operation switch 16c) being operated to "forward rotation", the rubber tires 9 rotates forwardly (clockwise), and the power cable 3 is reeled onto the cable drum 5. When this power cable 3 is reeled onto the cable drum 5, the power cable 3 is laterally reeled onto the cable drum 5 from an end portion thereof such that the power cable 3 does not overlap to the extent possible (see FIG. 15), due to the turn table operation lever 15*d* (or the turn table operation switch 16*d*) (see FIG. 9) being operated. Here, FIG. 15(*a*) is a diagram showing the initial stage of the power cable being reeled onto the cable drum by the cable reeling device according to an embodiment of the present invention, and FIG. 15(*b*) is a diagram showing the process of the power cable being reeled onto the cable drum by the cable reeling device.

Figure 10:
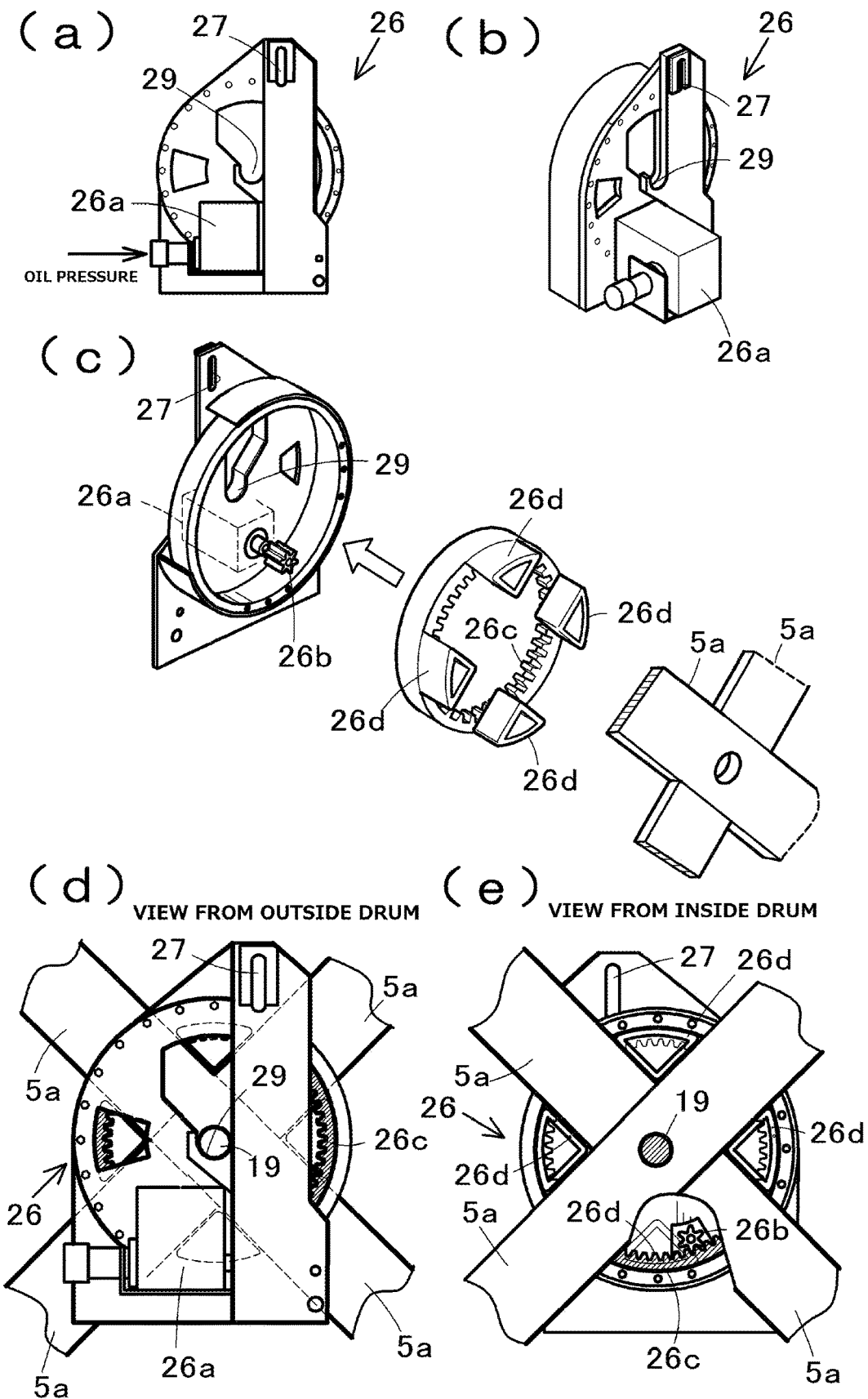
FIG. 10(a) is a front view of a booster device of the cable reeling device.
FIG. 10(b) is a front perspective view of the booster device of the cable reeling device.
FIG. 10(c) is an exploded perspective view of the cable drum and the booster device.
FIG. 10(d) is a front view of the booster device attached to the cable drum.
FIG. 10(e) is a back view of the booster device attached to the cable drum.
Figure 16:
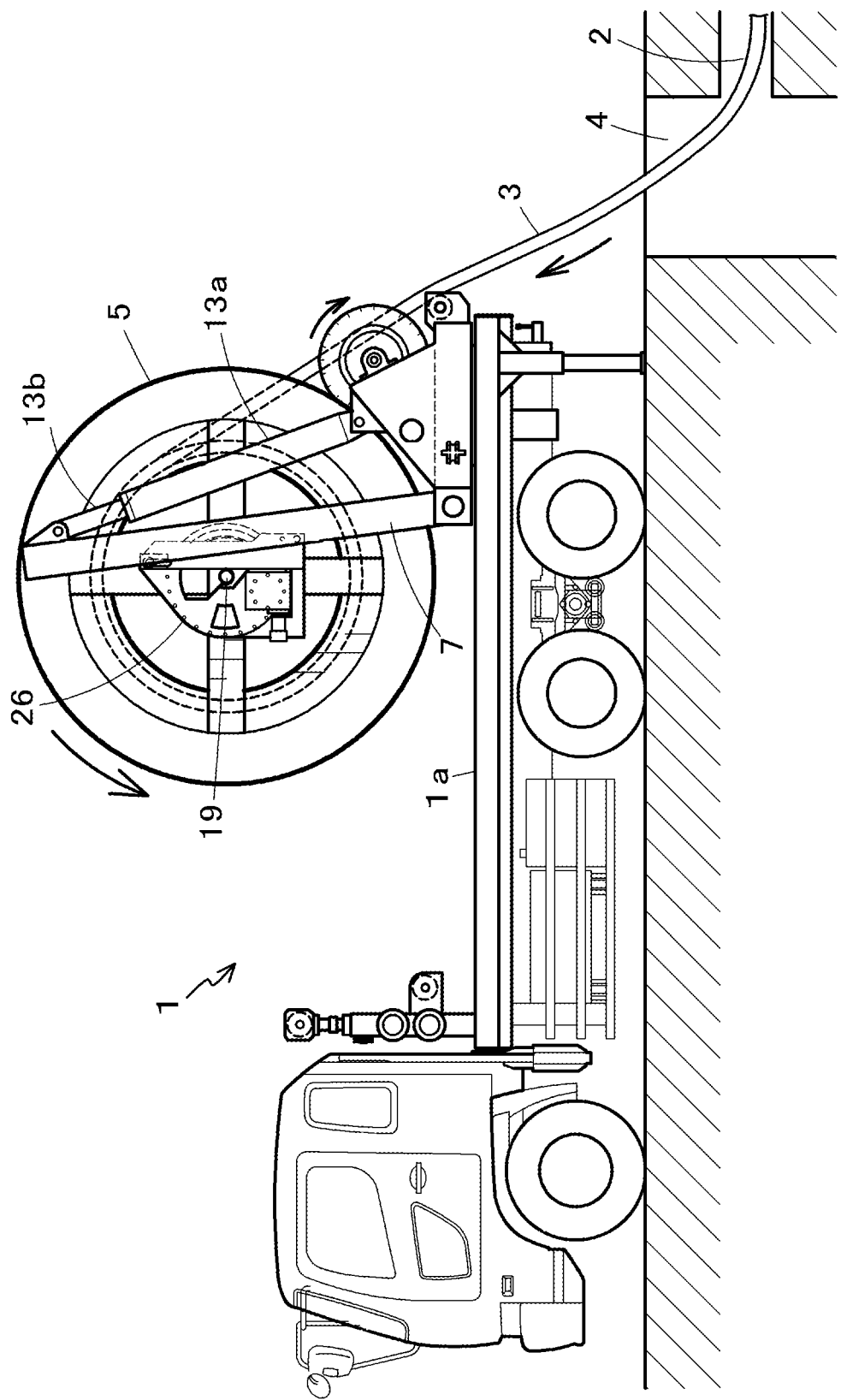
FIG. 16 is a diagram showing a state where a cable drum 5 is rotated using the booster device of the cable reeling device.
Figure 17:
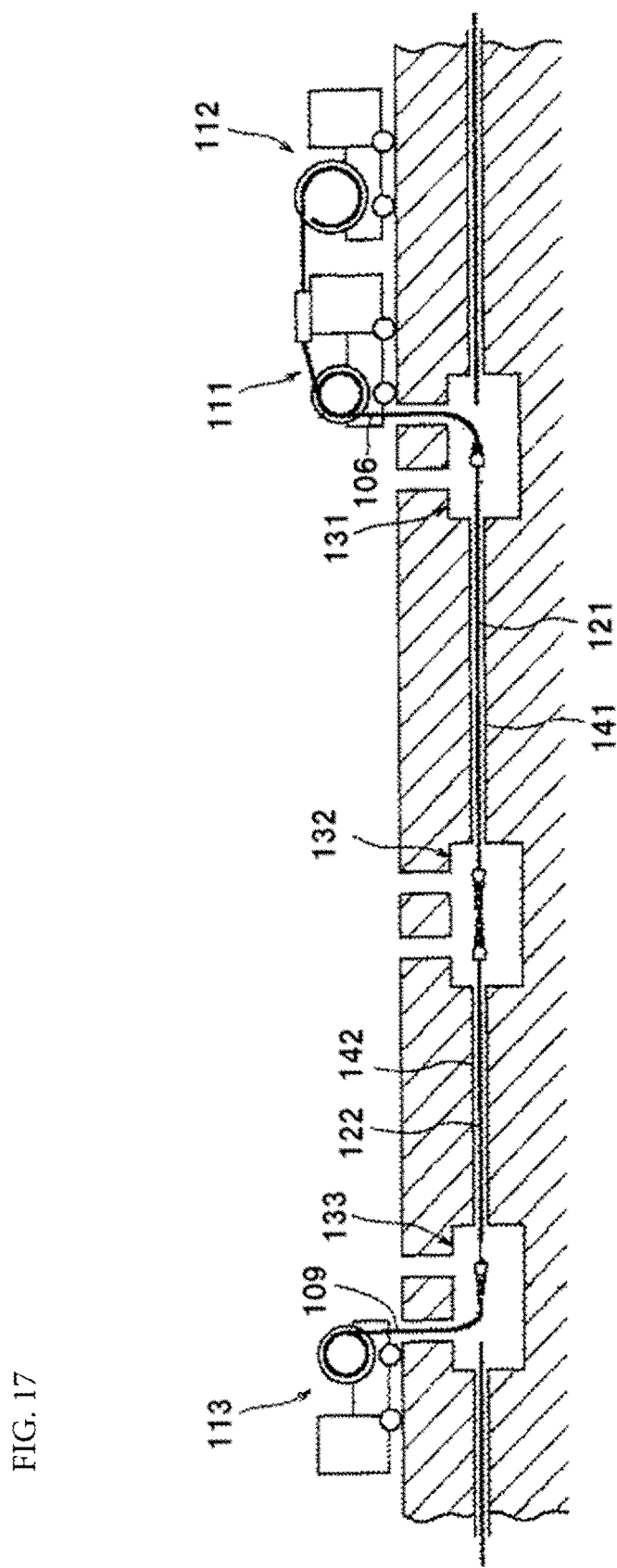
FIG. 17 is a diagram showing a conventional power cable-extraction method.

In the power cable reeling step, if a considerably large pulling force is required to pull up the power cable 3, the power cable 3 is reeled onto the cable drum 5 using the booster device 26 (see FIGS. 10 and 16). The booster device 26 is attached to one of the arms 7 due to the drum support member 8 being removed together with the arm fixing pin 18 from the arm 7, then the drum shaft 19 being inserted into a space above the drum shaft mount portion 29 of the booster device 26, and the arm fixing pin 18 being inserted into the booster device fixing hole 27 in the booster device 26. After the booster device 26 has been attached to the arm 7, the booster drum locking portions 26*d* of the booster device 26 is in a state of being fitted to the drum cross-shaped portion 5*a* of the cable drum 5 (see FIG. 10). Thus, upon the booster drum locking portion 26*d* rotating, the drum cross-shaped portion 5*a* is pressed in the rotational direction by the booster drum locking portion 26*d*, and thus the cable drum 5 can be rotated. Due to the hydraulic motor 26*a* being driven, the cable drum 5 is rotated using the booster device 26 together with the rubber tires 9, and the power cable 3 is reeled onto the cable drum 5 (see FIG. 16). Here, FIG. 16 is a diagram showing a state where the cable drum 5 is rotated using the booster device of the cable reeling device according to an embodiment of the present invention. Then, the procedure proceeds to S4.

In S4, a cable drum separation step is carried out. In this cable drum separation step, the cable drum 5 is brought down from the carrier 1*a* of the cable reeling device 1, and the cable drum 5 is separated from the cable reeling device 1. Specifically, the cable drum 5 is brought down from the carrier 1*a* of the cable reeling device 1 in the following procedure while operating the arm operation lever 15*b* (arm operation switch 16*b*) and the turn table operation lever 15*d* (turn table operation switch 16*d*), and the cable drum 5 is separated from the cable reeling device 1.

(1) After the power cable 3 of a predetermined length has been reeled onto the cable drum 5, the power cable 3 is cut at a portion at which the power cable 3 is not reeled onto the cable drum 5, and the cable drum 5 placed on the upper portion of the carrier 1*a* of the cable reeling device 1 is brought down to the ground. Specifically, the cable drum 5 attached between the two arms 7 is separated from the carrier 1*a* by raising the leading end of each arm 7, and the cable drum 5 attached between the two arms 7 moves rearward of the cable reeling device 1 by rotating the turn table 6 by 180 degrees. Then, by lowering the leading end of each arm 7, the cable drum 5 attached between the two arms 7 is brought down to the ground.

(2) After the drum shaft 19 has been separated from the drum support member 8 due to the leading end of each arm 7 being lowered, the drum shaft 19 is extracted from the drum shaft holes 28, and thus the cable drum 5 is separated from the cable reeling device 1. Then, the procedure proceeds to S5.

In S5, it is determined whether the power cable 3 in the underground conduit 2 has been completely pulled up to the ground. That is to say, it is determined whether the power cable 3 in the underground conduit 2 that is scheduled to be pulled up this time has been completely pulled up to the ground. If the determination result in S5 is "NO", the procedure proceeds to S1.

In S1, the cable drum placement step is carried out. In this cable drum placement step, the cable drum 5 is placed onto the carrier 1*a* of the cable reeling device 1, as mentioned above. Then, in S2, the power cable locking step is carried out. In this power cable locking step, the wire 24*a* is attached to the power cable 3 that has been cut in the cable drum separation step (S4), and the leading end of the wire 24*a* is locked to the cable drum 5. Here, in this state, the power cable 3 has already come to the outside of the manhole 4, and accordingly the wire 24*b* need not be attached to the power cable 3. Then, processing in S5, S1, S2, S3, and S4 is repeatedly carried out in that order until the determination result in S5 is "YES". When the determination result in S5 is "YES", the method for pulling up the power cable 3 ends.

As described above, by rotating the rubber tires 9, whose outer circumferential portions are made of butadiene rubber, while bringing the rubber tires 9 into intimate contact with the outer faces of the cable drum 5, the rotational force of the rubber tires 9 can be directly transmitted to the cable drum 5, and the cable drum 5 can be reliably rotated.

Note that the embodiment that has been disclosed this time is an example in all respects, and should not be considered to be restrictive. Furthermore, the scope of the present invention is defined by the claims rather than the above description, and is intended to encompass all modifications made within the meaning and scope equivalent to the claims.

DESCRIPTION OF REFERENCE NUMERALS

1 Cable reeling device
1*a* Carrier
2 Underground conduit
3 Power cable
4 Manhole
5 Cable drum
5*a* Drum cross-shaped portion
6 Turn table
6*a* Turn table hydraulic motor
6*b* Motor rotary gear
6*c* Turn table gear
7 Arm
8 Drum support member
9 Rubber tire
10 Rubber tire fixing shaft
11 Hydraulic motor
12 Outrigger
13*a* Arm cylinder
13*b* Arm piston
14 Edge-cutting device
14*a* Edge-cutting cylinder
14*b* Edge-cutting piston
14*cu* Wire locking portion
14*cd* Wire locking portion
15 Lever operation portion
16 Remote control operation portion
17 Fixed frame
18 Arm fixing pin
19 Drum shaft
19*a* Drum shaft fixing bolt insertion hole
20 Drum shaft receiver
21 Drum support member fixing position adjustment hole
22 Shaft fixing bolt 23 Outrigger operation portion
24a Wire
24b Wire
25a Guide roller
25b Guide roller
25c Guide roller
25d Edge-cutting device upper-end left roller
25e Edge-cutting device-back side intermediate roller
25f Edge-cutting device upper-end right roller
26 Booster device
26a Hydraulic motor
26b Motor planetary gear
26c Booster internal gear
26d Booster drum locking portion
27 Booster device fixing hole
28 Drum shaft hole
29 Drum shaft mount portion
31a Drum shaft receiver fixing bolt insertion hole

The invention claimed is:

1. A cable reeling device that is to be mounted in a vehicle for reeling in a power cable laid in an underground conduit, the device comprising:
 a turn table that is provided on a carrier and is capable of rotating;
 two arms that are provided in parallel on the turn table and each of which is capable of rotating in a vertical direction around a rotation center that is substantially a connection point between the arm and the turn table;
 drum support members that are attached to the respective arms and to which a cable drum disposed between the two arms is locked; and
 a drum rotating device for rotating the cable drum locked to the drum support members,
 wherein the drum rotating device comprising:
  rubber tires with outer circumferential portions having a circular shape thereof being made of elastic rubber, for rotating the cable drum by rotating with the outer circumferential portions being in intimate contact with outer faces of the cable drum locked to the drum support members;
  a rubber tire fixing shaft that is connected to at least two of the rubber tires and rotates around a rotation axis that is a center axis in a longitudinal direction thereof and
  a rubber tire rotation driving means for rotating the rubber tire fixing shaft.

2. The cable reeling device according to claim 1, wherein the rubber tire rotation driving means can rotate the rubber tire fixing shaft in two directions that are a forward rotation direction and a reverse rotation direction.

3. The cable reeling device according to claim 2, wherein the rubber tires are fixed so as to be able to move in a longitudinal direction of the rubber tire fixing shafts.

4. The cable reeling device according to claim 3, further comprising
 a drum rotation driving means for applying a rotational driving force to the cable drum from a side face of the cable drum.

* * * * *